United States Patent
Pandey (10) Patent No.: US 10,148,467 B2
(45) Date of Patent: Dec. 4, 2018

(54) PHY TRANSCEIVER WITH ADAPTIVE TX DRIVER AND METHOD OF OPERATING THEREOF

(71) Applicant: NXP B.V., Eindhoven (NL)

(72) Inventor: Sujan Pandey, Waalre (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 15/847,953

(22) Filed: Dec. 20, 2017

(65) Prior Publication Data

US 2018/0183629 A1 Jun. 28, 2018

(30) Foreign Application Priority Data

Dec. 22, 2016 (EP) .................................. 16206399

(51) Int. Cl.
| | |
|---|---|
| H04L 25/03 | (2006.01) |
| H04B 1/3822 | (2015.01) |
| H04L 25/02 | (2006.01) |
| H04B 1/38 | (2015.01) |
| H04B 1/04 | (2006.01) |

(52) U.S. Cl.
CPC ......... *H04L 25/03019* (2013.01); *H04B 1/38* (2013.01); *H04B 1/3822* (2013.01); *H04L 25/028* (2013.01); *H04L 25/0292* (2013.01); *H04L 25/03885* (2013.01); *H04B 2001/0416* (2013.01); *H04L 2025/03356* (2013.01); *H04L 2025/03471* (2013.01); *H04L 2025/03636* (2013.01)

(58) Field of Classification Search
CPC ......... H04L 25/03019; H04L 25/03885; H04L 25/0292; H04L 25/028; H04L 2025/03636; H04L 2025/03471; H04L 2025/03356; H04B 2001/0416; H04B 1/38; H04B 1/3822

See application file for complete search history.

(56) References Cited

U.S. PATENT DOCUMENTS

| | | | |
|---|---|---|---|
| 8,437,711 B2* | 5/2013 | Rofougaran ........ | H04W 52/245 455/127.1 |
| 8,599,962 B1 | 12/2013 | Loeb et al. | |
| 2004/0032921 A1* | 2/2004 | Bui ..................... | H04L 25/0216 375/350 |
| 2008/0310487 A1* | 12/2008 | Hammerschmidt . | H04B 7/0413 375/219 |
| 2014/0098844 A1 | 4/2014 | Mobin et al. | |
| 2017/0214553 A1* | 7/2017 | Ciacci .................. | H04L 27/368 |

* cited by examiner

*Primary Examiner* — Jean B Corrielus
(74) *Attorney, Agent, or Firm* — Rajeev Madnawat (57) ABSTRACT

The present application relates to a baseband communications transceiver and a method of operating the baseband communications transceiver. The transceiver comprises an analog front end transmitter section, AFE TX, with a digital to analog converter, DAC, and a transmission, TX, driver; an analog front end receiver section, AFE RX, with an analog-to-digital converter, ADC; at least one equalizer arranged downstream of the AFE RX and implemented on the basis of an adaptive filter; at least one loss encode and a channel monitoring block. The at least one loss encode is configured to determine loss value data indicative of a signal loss on the communication channel based on filter coefficients of the adaptive filter. The channel monitoring block is configured to determine an amplitude control signal, which is provided to control the amplitude of analog signals generated by the TX driver of the AFE TX.

15 Claims, 8 Drawing Sheets

PHY TRANSCEIVER WITH ADAPTIVE TX DRIVER AND METHOD OF OPERATING THEREOF

CROSS-REFERENCE TO RELATED APPLICATIONS

This application claims the priority under 35 U.S.C. § 119 of European Patent application no. 16206399.4, filed on Dec. 22, 2016, the contents of which are incorporated by reference herein.

FIELD OF THE INVENTION

The present disclosure relates generally to an Ethernet PHY transmitter and particularly to controller for controlling a TX driver of an Ethernet PHY transmitter. More particularly, the present disclosure relates to an Ethernet PHY transceiver with a channel monitoring functionality enabling the adjustment of the amplitude of differential signals on an Ethernet link.

BACKGROUND

In general, Ethernet is a point-to-point communication technology. More complex networks are created by using layer 2 (according to the ISO/OSI stack) bridges (also called switches). Switches enable the definition of complex network topologies and offer many services including the basic relying of frames (the basic Ethernet communication element) from one source node to multiple destinations, and more complex operations such as channel bandwidth allocation, network partitioning via virtual LANs (VLANs) and traffic prioritization.

The bandwidth requirements of modern and future automotive applications are posing a relevant challenge to current in-vehicle networking (IVN) technologies such as Controller Area Network (CAN) and FlexRay. Thanks to the latest development of the Ethernet technology, a 100 Mbps Ethernet link can now be implemented and a 1 Gbps link will be available in near future. The automotive Ethernet technology is based on an unshielded twisted pair of copper wires while limiting the EMC (electromagnetic compatibility) requirements below the threshold imposed by the regulatory automotive standards. Switched Ethernet networks have been implemented in the automotive market for supporting bandwidth-intensive applications such as backbones interconnecting various domains, infotainment and surround-view applications.

In the automotive environment, EMC requirements are crucial and have to be controlled. The unshielded twisted pair of copper wires is not only subjected to interferences but is a source of EME (electromagnetic emission) at the same time. The source of such EME depends inter alia on the mode conversion function of the transfer modes (common mode and differential mode) and the magnitude of the differential signals. Differential mode signals can be partly converted to common mode signals along the transmission path of a data link and vice versa.

It is immediately understood that there is a need to control or minimize EME emitted by communication links in an automotive environment.

SUMMARY

The present invention provides a baseband communications transceiver, a method of operating a baseband communications transceiver and a non-transitory, medium bearing computer executable instructions for operating a baseband communications transceiver as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
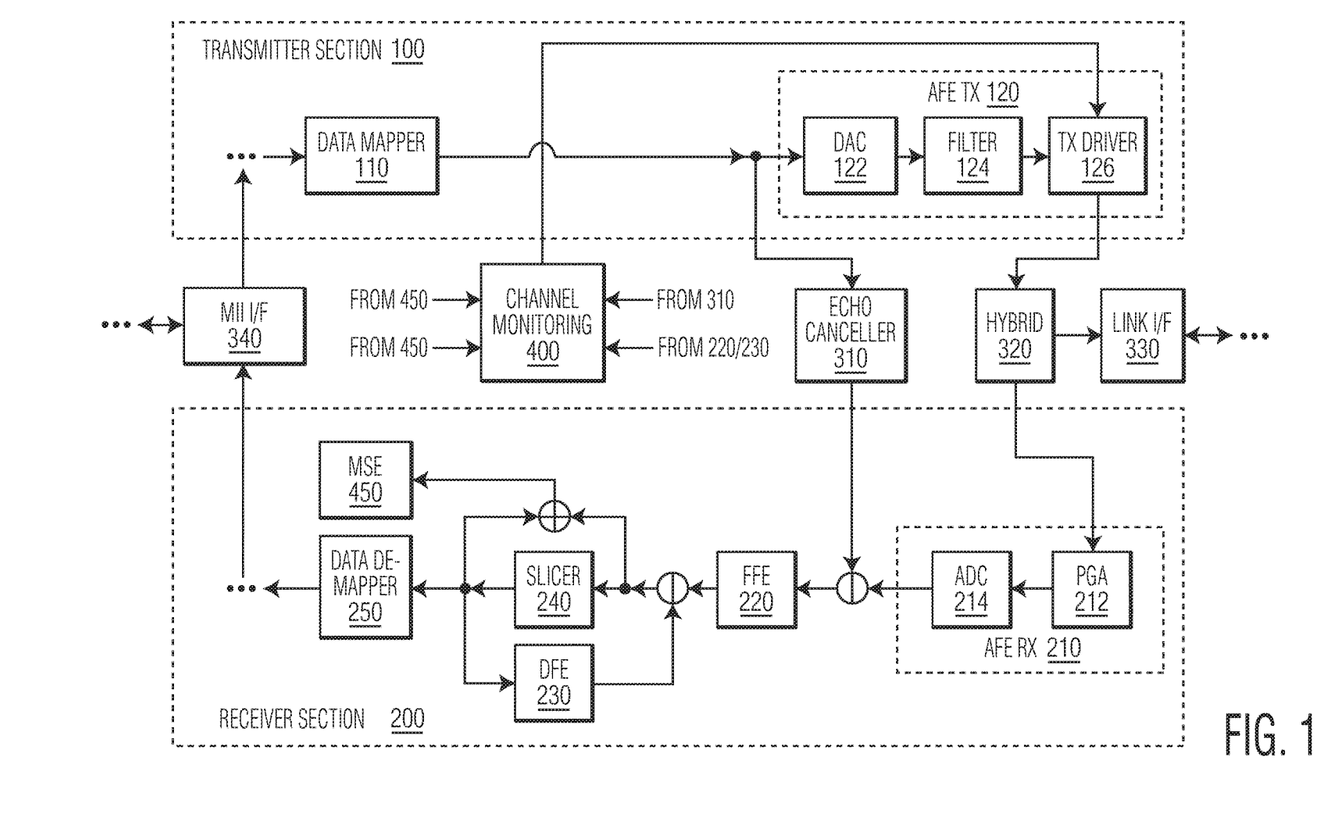
FIG. 1 schematically illustrates a block diagram of a PHY circuitry according to an example of the present invention.

FIG. 1 illustrates an example PHY circuitry. The PHY circuitry may be an integrated circuit including digital and analog components, or other type of circuitry such as in the form of a chip. Part of the PHY circuitry may also be implemented as software or firmware with an embedded or external digital signal processor (DSP) or micro controller. The PHY circuitry may transmit and receive the data physically across a communication link. The PHY circuitry 100 may transmit data at a predetermined target rate, such as 100

Mbits or second or 1000 Mbits per second or even higher. To achieve the predetermined target rate, the PHY circuitry may transmit data at a corresponding baud rate. The baud rate indicates a symbol rate or modulation rate expressed in symbols per second or pulses per second. The baud rate is the number of distinct symbol changes (signaling events) per second made by the PHY circuitry to the communication link. The symbols may be transmitted as part of a digitally modulated signal.

The PHY circuitry provides technical solutions to achieve desired robust transmission of data, such as IEEE 802.3 or Ethernet data, at a predetermined target rate, such as 100 Mbits or second or 1000 Mbits per second in an automobile environment. The PHY circuitry may implement a line coding scheme. The line coding scheme may be configured to convert data from the MAC circuitry in a predetermined format, for example symbols of a predetermined length. Based on the line coding scheme, the PHY circuitry may be configured, or adjusted to transmit the generated symbols at a predetermined baud rate to achieve a predetermined target data transmission rate. For example, to achieve data transfer rate of 1000 Mbits per second, the PHY circuitry may generate symbols that are 9 bits long, apply Reed-Solomon FEC encoding, apply 3-bits-to-2 PAM-3 (pulse amplitude modulation level 3) symbols mapping, and operate at a 750 MHz baud rate. The PHY circuitry may perform forward error correction (FEC) when receiving the symbols so that the communication is robust and meets a specified error threshold.

The PHY circuitry may include circuitry such as a transmitter section 100, a receiver section 200, a media independent interface (MII) 340, an echo canceller 310, a hybrid 320, and a link interface 330.

The media independent interface 340 may be a communication interface that connects the PHY circuitry with the MAC circuitry (not shown). The media independent interface 340 may be a reduced media-independent interface, a gigabit media-independent interface (GMII), a reduced gigabit media-independent interface, a serial gigabit media-independent interface (SGMII), or any other type of media independent interface.

The hybrid 320 may be analog circuitry that cancels the transmitted signals that are coupled into the received signals. For example, the hybrid 320 may reduce electric signal reflections due to transmission and reception of signals over the same communication link.

The echo canceller 310 may be circuitry that facilitates mitigation of residual reflected signals from the transmitter section 100. For example, the echo canceller 310 may further reduce remnant transmit signal reflections after cancellation by the hybrid 320.

The link interface 330 may be a communication interface that connects the PHY circuitry with the communication link. For example, the link interface 330 may be a two-pin connector for single pair automotive Ethernet, a registered jack (RJ) type connecter such as a RJ45 connector, a RJ48 connecter, a RJ61 connecter, or any other type of communication link interface. The link interface 330 may facilitate transmission and reception of data via the communication link using a variable input/output voltage range. The communication link is typically formed by a multi-wire cable. In case of automotive Ethernet, the communication link cable comprises a single pair of twisted wires also referred to as single twisted-pair cable.

The transmitter section 100 may be circuitry that facilitates transmission of data via the communication link. The transmitter section 100 may facilitate conversion of digital input data received from the media independent interface to analog output voltage levels transmitted via the hybrid 320 and the link interface 330. The transmitter section 100 may convert the input data at a predetermined rate to meet the predetermined data transmission rate. In an example, the transmitter section 100 may include a physical coding sublayer (PCS) framer (not shown), a data encoder (not shown), a transmission data scrambler (not shown), a data mapper 110, and an analog front-end transmitter (AFE TX) 120.

The AFE TX 120 may facilitate conversion of digital data to analog signals. The AFE TX may output the analog signals to the hybrid 320 and link interface 330, which may further transmit the signal over the communication link. In an example, the AFE TX 120 may include a digital-to-analog converter (DAC) 122, a transmission analog filter 124, and a transmission driver 126. The DAC 122 may convert data from digital to analog form. The transmission analog filter 124 may filter the electronic signals prior to transmission via the communication link. The DAC 122 may map a digital signal output by the data mapper 110 to a predetermined voltage level. The data mapper 110 converts the binary data into symbols. For instance a symbol may comprise ternary data, which are coded on a base 3 system. In an example, the binary data with values 0 and 1 may be converted to symbols each having a values −1, 0, or 1. Such symbols can be represented by balanced ternary data. Subsequently, the ternary data (1, 0, and −1) is mapped by the AFE TX 120 to three distinct voltage levels such as −0.5V, 0V, and +0.5V.

The receiver section 200 may be circuitry that facilitates reception of data via the communication link. The receiver section 200 may facilitate conversion of analog input voltage levels received via the link interface 330 and hybrid 320 to digital data provided to the MAC circuitry via the media independent interface. The receiver section 200 may convert the analog voltage levels at a predetermined rate to meet the predetermined data transmission rate at which the analog signals may be received. In an example, the receiver section 200 may include an analog front-end receiver (AFE RX) 210, a feed forward equalizer (FFE) 220, a decision feedback equalizer (DFE) 230, a slicer 240, a data de-mapper 250, a data de-scrambler (not shown), a data decoder (not shown), and a PCS de-framer (not shown).

The AFE RX 210 may comprise a programmable gain amplifier (PGA) 212 and an analog to digital converter (ADC) 214 that converts the analog signals received from the hybrid 320 and link interface 330 into digital data, such as in the form of binary words. The converted digital data may be further processed by the echo canceller 310 to remove the residual reflections of the transmit signals. The digital data may be further equalized by the FFE 220, DFE 230, and slicer 240. The FFE 220 may be a finite impulse response (FIR) filter and that uses voltage levels of the received data associated with previous and future symbols to correct the voltage level of the current symbol. The DFE 230 may further equalize residual linear distortions contributed by the previous symbols. Finally the slicer 240 may make decisions on the received data based upon the equalized signal. In an example, the outputs from the DFE 230 and the FFE 220 may be added together at an adder and the result provided to the slicer 240. The slicer 240 may be responsive to the received signals at its input, and outputs the nearest symbol value from the constellation of allowed discrete levels. The slicer 240, thus, provides the PAM symbols in digital format.

Figure 2:
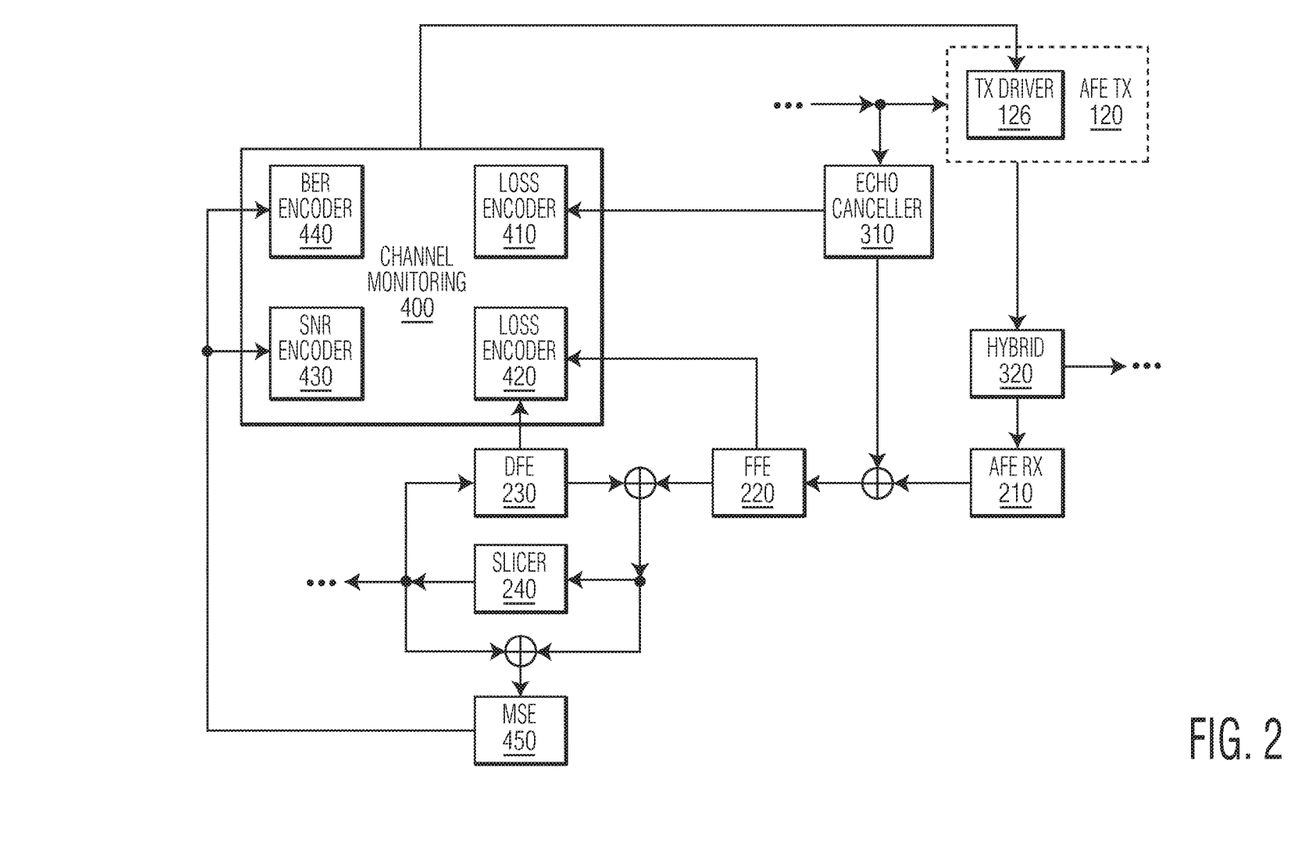
FIG. 2 schematically illustrates a block diagram of an enlarged view of the PHY circuitry according to an example of the present invention.

The example PHY circuitry further comprises a channel monitoring module 400, which is shown in more detail in FIG. 2. The channel monitoring module 400 is coupled to one or more components including adaptive filters, which are responsive to current link conditions and channel specifications.

Referring now to FIG. 2, a channel monitoring module according to an embodiment of the present application, which is implementable with the example PHY circuitry of FIG. 1. The channel monitoring module 400 is configured to monitor current conditions on the communication channel and to adjust the TX driver 126 of the AFE TX 120 accordingly. The monitoring and driver adjustment operated by the channel monitoring module 400 is performed in the basis of data obtainable from adaptive filter components of the example PHY circuitry, which include inter alia the echo canceller 310, the feed forward equalizer (FFE) 220, the decision feedback equalizer (DFE) 230, and an mean square error (MSE) filter 450. The operation of the channel monitoring module 400 will be described below with respect to the different input signals.

Echo Signal or Return Loss

Figure 3:
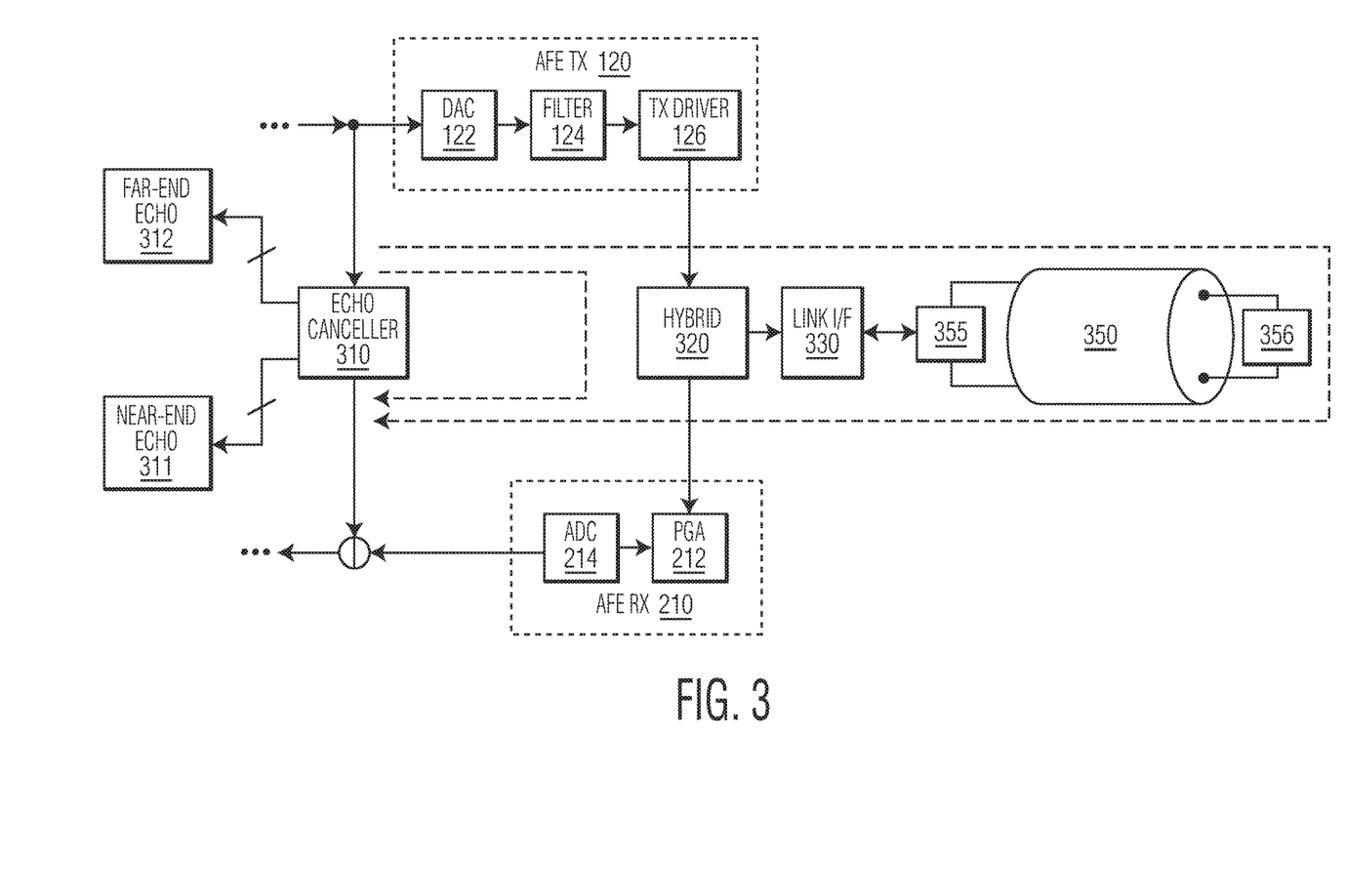
FIG. 3 schematically illustrates a block diagram of another enlarged view of the PHY circuitry according to an example of the present invention.
Figure 4:
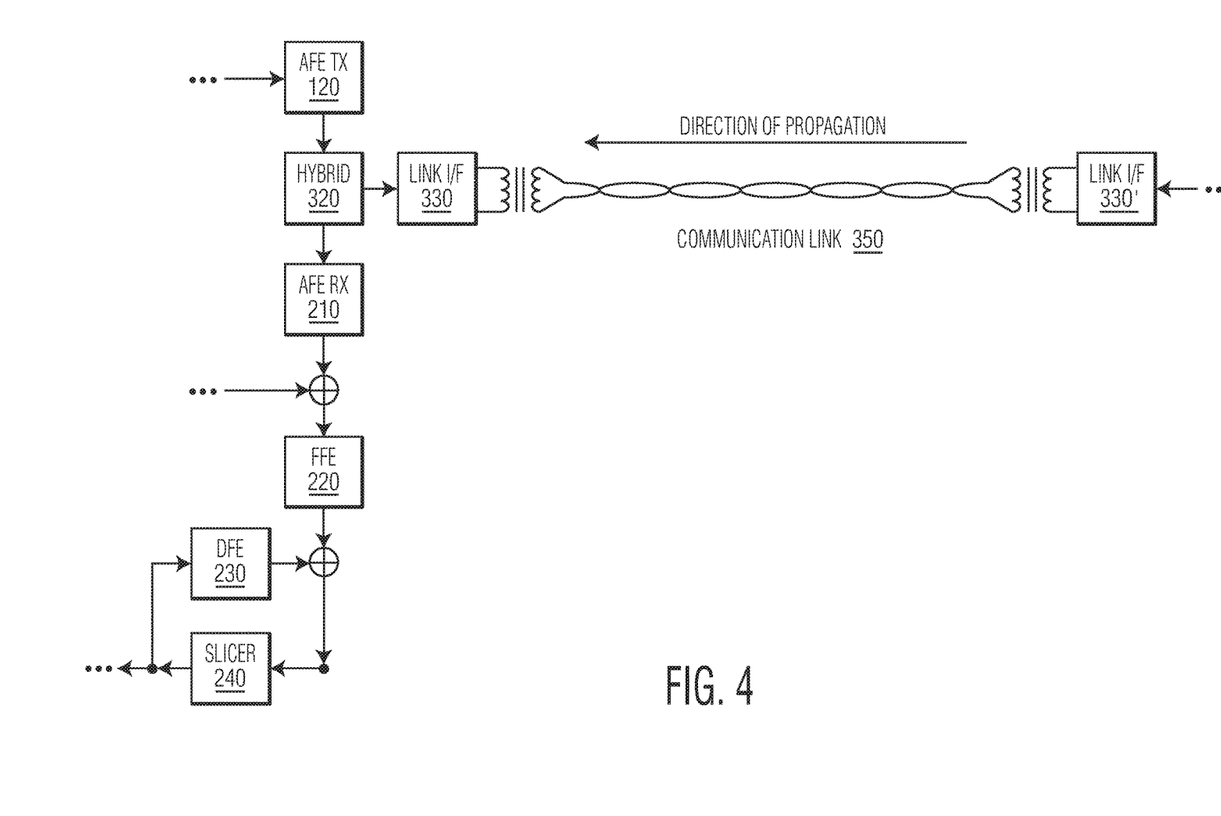
FIG. 4 schematically illustrates a block diagram of yet another enlarged view of the PHY circuitry according to an example of the present invention.

Referring now to FIG. 3, an echo signal is a remnant residual signal of the transmit signal generated at the transmitter section and detected at the receiver second. In full-duplex communication, the hybrid is typically used to isolate the receiver section from the transmit signal at a certain degree. However, cable and connector impedance variation still results in substantial leakage of the substantially large transmit signal into the receiver section, thereby creating an echo signal, the so-called near-end echo. Also, impedance discontinuities along and at the end of the cable produce an echo signal, the so-called far-end echo. The echo signal (i.e. the remnant transmit signal leaked in the hybrid and/or reflected at one or more points along the transmission medium to the counterpart PHY circuitry) superimposes the receive signal, which may be week, such that the detecting and decoding thereof at the receiver section may be inferred by the echo signal. Hence, mismatches within the hybrid and impedance discontinuities at various points in the transmission medium result in substantial echo signal. The echo signal comprises the near-echo end signal, which is the remnant transmit signal leaked in the hybrid, and the far-end echo signal, which is the remnant transmit signal reflected at one or more points along the transmission medium to the counterpart PHY circuitry. In practice, the echo signal is for instance quantified by applying a reference signal such as an impulse to the transmit port of the hybrid and measuring the response at the receive port. The task of echo canceller is to generate echo compensation signal that, when added to the receive signal, cancels the contribution of the echo thereto. The strength of the compensation signal is hence indicative of the quality of the transmission channel.

The contributions of the near-end echo signal and the far-end echo signal to the echo signal may be separated by calibration measurement.

The near-end echo signal may be determined in that a communication link cable 350 is attached to the link interface 330. The length of the communication link cable 350 is selected to be as short as possible and communication link cable 350 comprises terminating resistors 355 and 356 at each end of it. In this measurement arrangement, it can be assumed that a far-end echo signal does not contribute to the echo signal received at the AFE RX 120 when a calibration signal is supplied by the AFE TX 120 to the communication link cable 350. The far-end echo signal is substantially eliminated because of the length of the communication link cable 350, which length is selected as short as possible. A remnant transmit signal due to reflections at one or more points along the communication link cable 350 should not be expected.

The far-end each signal may be determined in that a communication link cable 350 with maximal allowed length or a length, which is to be used, is connected to the link interface 330. Again, the communication link cable 350 comprises terminating resistors 355 and 356 at each end of it. In this measurement arrangement, it has to be assumed that the echo signal received at the AFE RX 120 comprises contributions of the near-end echo signal and the far-end echo signal when a calibration signal is supplied by the AFE TX 120 to the communication link cable 350. When assuming that the near-end echo signal and the far-end echo signal are substantially independent from each other, the contribution of the far-end echo signal to the received echo signal can be determined by subtracting the near-end echo signal.

When further assuming that the near-end echo signal is time and environment independent, e.g. that the characteristics and properties of the hybrid 320 are substantially insensitive to aging and operating environment, those skilled in the art will immediately understand that the contribution of the near-end echo signal to the echo signal may be repeatedly determined in use of the PHY circuitry 200.

For instance, the counterpart PHY circuit connected in use via the communication link cable 350 to the PHY circuitry 200 may be powered off while the calibration signal is supplied to the communication link cable 350. The near-end echo signal may be predetermined at manufacturing time of the PHY circuit 200 and stored for instance in the echo canceller 310. Subtracting the near-end echo signal from the received echo signal yields to the far-end echo signal. The echo canceller 310 is hence enabled to separately provide the near-end echo 311 and the far-end echo 312.

The repeated determining of the far-end echo signal may reflect aging effects affecting the communication link cable 350, the connectors thereof and/or the connector-plug arrangements. The repeated determining of the far-end echo signal may further reflect changes of the environment affecting the communication link cable 350 such as changes in the electromagnetic emission environment due to external components or due to a changed course of the communication link cable 350.

Channel Insertion Loss or Insertion Loss

Insertion loss is a measure of the loss a signal experiences as it propagates down the communication link. Signal loss can be traced back to various loss mechanisms. Some of the signal is converted to heat due to the resistance of the copper wires or the slight conductivity of the insulation material. A portion of the signal energy is also reflected as the signal encounters impedance changes when it propagates along the communication link. In addition, signal energy may be lost as radiation because of common-mode conversion and subsequent coupling to free space. All of these losses, as well as others, are collectively referred to as insertion loss. The insertion loss is frequency dependent since different loss mechanisms can affect some transmission frequencies more than others.

In particular high data rate transmission suffers from significant channel losses. In order to mitigate these adverse effects, channel losses have been improved by equalizers in the signal path. Equalizers used for mitigating the adverse effects include the decision feedback equalizer (DFE) 230 and the feed forward equalizer (FFE) 220.

The DFE 230 at the receiver section 200 is provided to remove post-cursor inter-symbol interference (ISI) due to channel losses by feeding back decisions that are clean. Data, which are received from the communication link may be distorted due to loss mechanisms, are received by a FFE 220. The FFE 220 in configured to condition the received signal by adjusting the signal gain so that the signal amplitude of data signals forwarded to summing device is substantially constant. The data slicer 240 in configured to provide decisions to the DFE 220 to supply a signal to the summing device to cancel inter-symbol interference caused by the most recently processed symbols from the presently received symbols. An adaptive loop drives the FFE 220 and DFE 230 for optimal settings for given channel loss characteristics.

The aforementioned echo canceller 310, the feed forward equalizer (FFE) 220 and the decision feedback equalizer (DFE) 230 are based on adaptive FIR filters.

In general, an adaptive filter is arranged to accept a digital input signal R(n) which is fed into the adaptive filter. The adaptive filter is configured to compute a digital output signal y(n) at each time typically indicated by sampling index n (wherein $t(n)=n \cdot T_s$, $T_s=1/f_s$, $T_s$ is the sampling time and $f_s$ is the sampling rate/frequency). A digital output signal P(n) is a function of the digital input signal R(n) and a set of parameters including so-called filter coefficients $c_i(n)$:

$$P(n) = \sum_{i=0}^{L-1} c_i(n)r(n-i) = \sum_{i=0}^{L-1} p_i(n) = C(n)R(n)$$

where $R(n)=[r(n), r(n-1), \ldots, r(n-L+1)]^T$ is the input signal vector and $C(n)=[c_0(n), c_1(n), \ldots, c_{L-1}(n)]^T$ is the filter coefficient vector.

The digital output signal R(n) is compared to a response or reference signal by subtracting the digital output signal d(n) and the reference signal at each time n yielding to a difference signal e(n), which is called error signal e(n). The error signal is fed into a component, which is arranged to adjust the filter coefficients $c_i(n)$ in accordance with an adaptive filter coefficient convergence algorithm. The adaptive convergence algorithm adapts the filter coefficients $c_i(n)$ from time n to newly adapted filter coefficients $c_i(n+1)$ at time (n+1), where i=0, . . . , L-1. The objective of the adaptive convergence algorithm is typically to minimize a cost function based on the error signal e(n). The parameters within the adaptive filter may depend on its design and computational implementation.

The adaptive convergence algorithm of an adaptive filter for adjusting the filter coefficients $c_i(n)$ is performed to minimize a cost function selected with respect to a respective use case of the adaptive filter. The adjusting of the filter coefficients $c_i(n)$ is performed in an iterative procedure:

$C(n+1)=C(n)+\mu(n) \cdot G(e(n),S(n),\Phi(n))$ where G(e(n), S(n), Φ(n)) is a nonlinear vector function, μ(n) is the so-called step size, e(n) is the error signal and S(n) is the input signal vector. Φ(n) is a vector of states that may be used to describe pertinent information of the characteristics of the input signal, error signal and/or filter coefficients. Different implementations of the cost function are known in the art including for instance the least-mean-square algorithm and derivatives thereof.

For instance, the conventional LMS algorithm is based on the following equation:

$C(n+1)=C(n)+\mu \cdot e(n) \cdot R(n)$.

For instance, the sign-sign LMS algorithm, on the other hand, requires only the sign of the error and the sign of data for adaptation:

$C(n+1)=C(n)+\mu \cdot \text{sign}(e(n)) \cdot \text{sign}(R(n))$.

Figure 5:
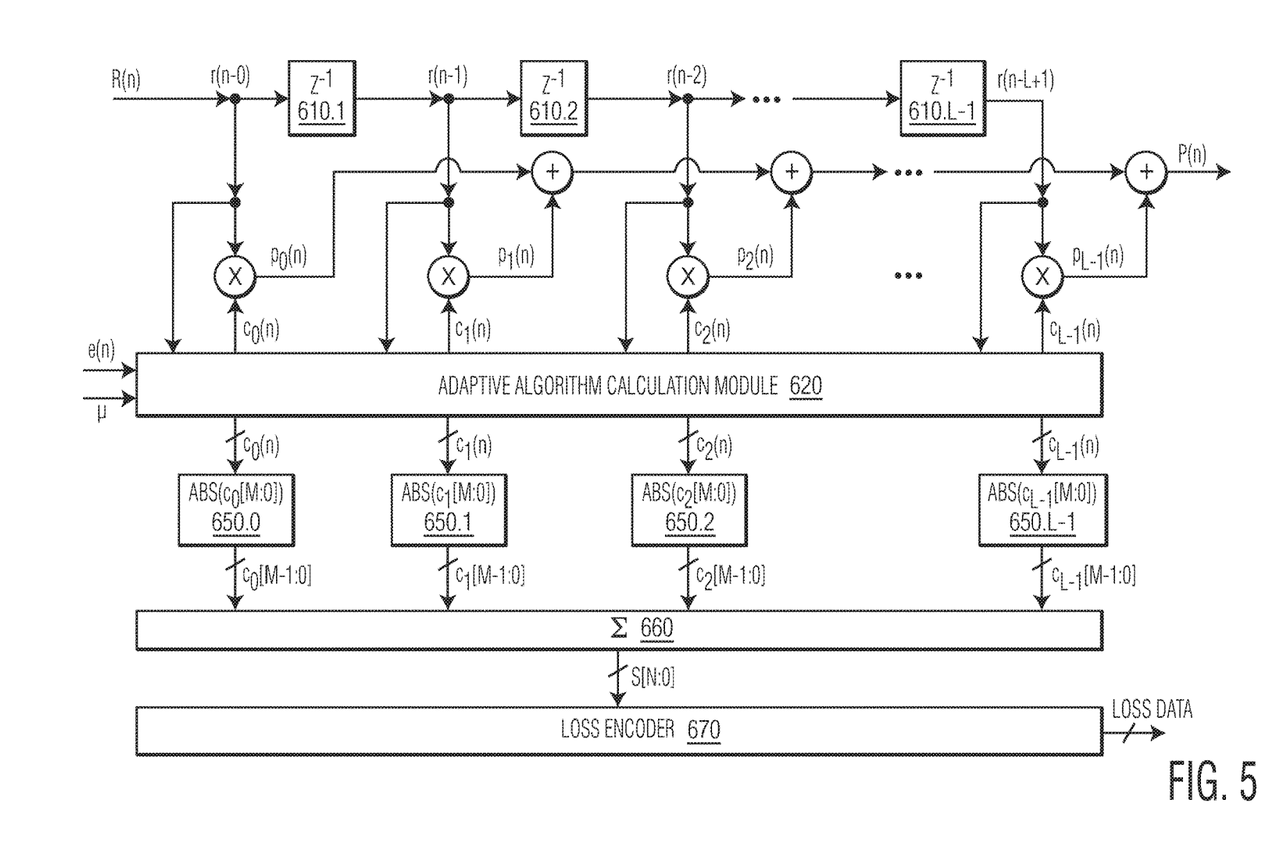
FIG. 5 schematically illustrates a block diagram of an adaptive filter implementation with a loss encoder block according to an example of the present invention.

Referring now to FIG. 5, a block diagram of an adaptive filter with filter coefficient processing according to an embodiment of the present application is schematically illustrated.

The adaptive filter of filter order L comprises a delay line with delay elements $Z^{-1}$ 610.1 to 610.L−1, which provides L−1 tapped delay signals r(n−i), i=0, . . . , L−1 generated from the input signal R(n). The filter coefficients are adapted by the adaptive convergence algorithm module 620, which performs the filter coefficient adaptation according to a filter coefficient convergence algorithm. The output signal P(n) is generated from the tapped delay signals r(n−i) each multiplied with the associated filter coefficient $c_i(n)$ as described above.

The filter coefficients $c_i(n)$ are further processed to obtain one or more values indicative of the respective experienced loss, which means the return loss and/or the insertion loss. The filter coefficients $c_i(n)$ may be normalized filter coefficients $c_i(n)$.

The filter coefficients $c_i(n)$ are obtained from the adaptive convergence algorithm module 620 of the adaptive filter and absolute values of the filter coefficients $ABS(c_i(n))$ are determined by absolute value blocks 650.0 to 650.L−1. In an example, the absolute values of the filter coefficients $ABS(c_i(n))$ are obtained by discarding the sign bit, for instance in case a numerical format is used to code the values of the filter coefficients $c_i(n)$, which comprises a sign bit such as known from IEEE floating point numerical format coding. For instance, M+1 bits are used for the numeric format coding of the value of the filter coefficients $c_i(n)=c_i(n)[M:0]$. After discarding of the sign bit, M bits remain for the numeric format coding of the absolute value of the filter coefficients $ABS(c_i(n))=c_i(n)[M-1:0]$ In an example of the present application, the absolute values of the filter coefficients $ABS(c_i(n))$ are further summarized by an adder block 660 yielding a summation value S(n):

$$S(n) = \sum_i ABS(c_i(n))$$

The resulting sum is a function of the area integral under a curve defined by the filter coefficients $c_i(n)$. In an example, N+1 are used for the numeric format coding of the summation value $S(n)=s(n)[N:0]$, wherein N M.

The obtained summation value is further processed at a loss encoder block 670. The loss encoder block 670 is configured to generate loss value, which is associated with the determined summation value S(n).

The loss encoder block 670 comprises a set of loss values, each of which is associated with a summation value interval. In an example, the summation value intervals are adjacent to each other and non-overlapping. Hence, each summation value S(n) can be associated with a loss value by determining, in which summation value range a determined summation value S(n) lies. The set of loss values comprises a predefined number of loss values. The association of loss values to summation value intervals may be predefined and/or configurable. The loss values may be predefined. The loss encoder block 670 may comprise a range lookup table, which associated a predefined number of summation value intervals with a number of predefined loss values.

The absolute value blocks 650.0 to 650.L−1 and/or the adder block 660 may be part of or arranged with the loss encoder block 670 or the adaptive filter.

Figure 6:
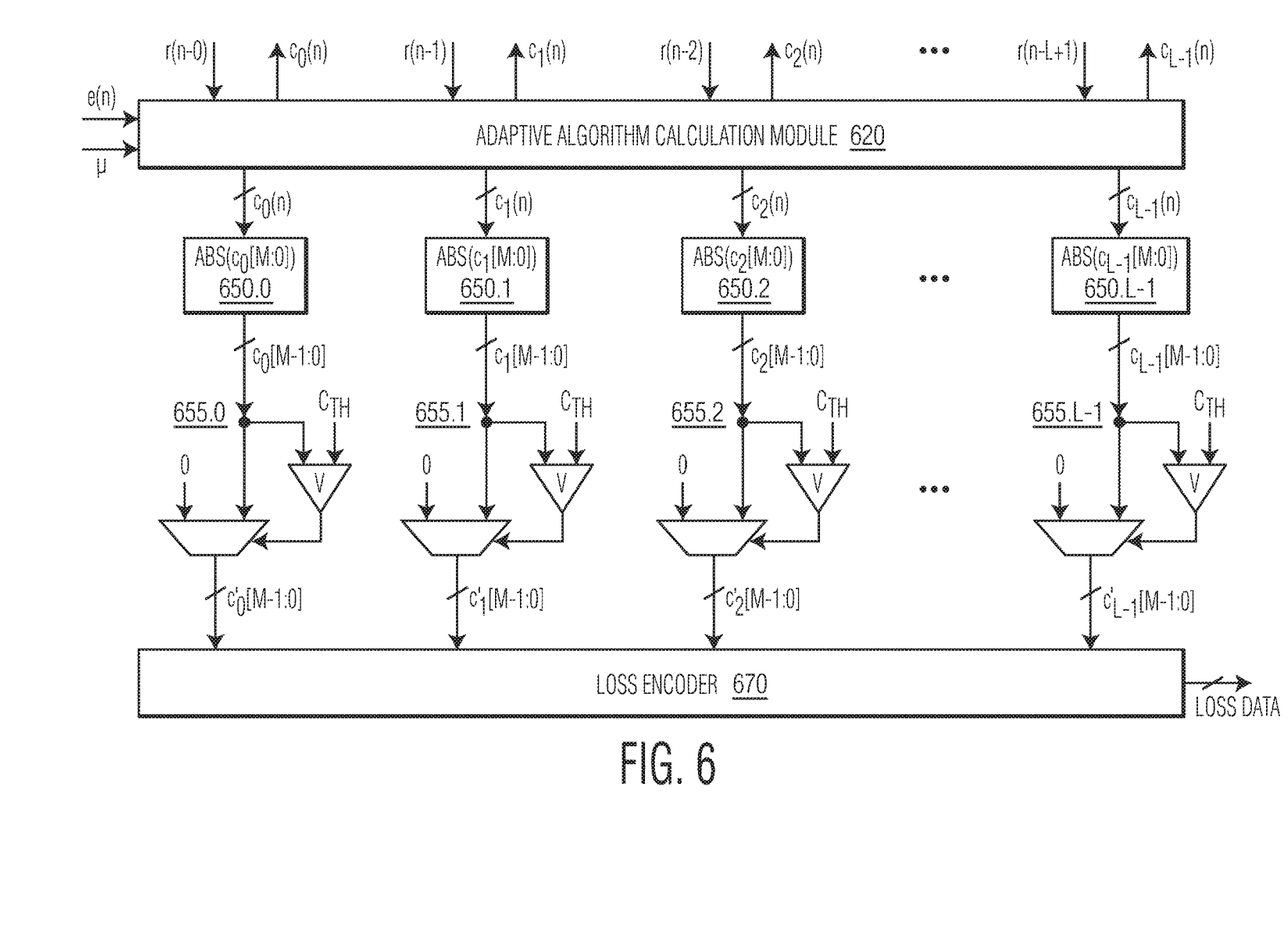
FIG. 6 schematically illustrates a block diagram of another adaptive filter implementation with a loss encoder block according to an example of the present invention.

Referring now to FIG. 6, a block diagram of an adaptive filter with filter coefficient processing according to another embodiment of the present application is schematically illustrated.

The adaptive filter implementation substantially correspond to that shown in FIG. 5 and described above with reference thereto. The delay line of the adaptive filter of filter order L provides L−1 tapped delay signals r(n−i), i=0, . . . , L−1 generated from the input signal R(n). The adaptive convergence algorithm module 620 is configured to perform the filter coefficient adaptation according to a filter coefficient convergence algorithm. The output signal P(n) is generated by summarizing the product of the tapped delay signals r(n−i) and the associated filter coefficient $c_i(n)$ as described above.

The filter coefficients $c_i(n)$ are further processed to obtain one or more values indicative of the respective experienced loss, which means the return loss and/or the insertion loss.

The filter coefficients $c_i(n)$ are obtained from the adaptive convergence algorithm module 620 of the adaptive filter and absolute values of the filter coefficients ABS($c_i(n)$) are determined. Each absolute value of the filter coefficient ABS($c_i(n)$) is further supplied to a threshold filter 655.0 to 655.L−1, which means that an absolute value of the filter coefficient ABS($c_i(n)$) is set to or replaced by predefined default value such as zero value if the absolute value of the filter coefficient ABS($c_i(n)$) is below a threshold value $c_{TH}$. The threshold value $c_{TH}$ is a predefined value. As schematically illustrated in FIG. 6, the absolute values of the filter coefficients ABS($c_i(n)$) are fed into individual comparators switching multiplexers. The comparators are configured to compare the respective input absolute value of the filter coefficient ABS($c_i(n)$) with the threshold value $c_{TH}$. In case the input absolute value of the filter coefficient ABS($c_i(n)$) exceeds the threshold value $c_{TH}$, the absolute value of the filter coefficient ABS($c_i(n)$) is passed to the loss encoder block 670 by the accordingly switched multiplexer. Otherwise a default value such as zero value is passed to the loss encoder block 670 by the accordingly switched multiplexer instead of the absolute value of the filter coefficient ABS($c_i(n)$) being below the threshold value $c_{TH}$. The filter function $F_T(x)$ of the threshold filtering may be denoted as following:

$$c_i'(n) = F_{TH}(\text{ABS}(c_i(n)))$$

$$F_{TH}(x) = \begin{cases} x & x > c_{TH} \text{ or } x \geq c_{TH} \\ 0 & \text{otherwise} \end{cases}$$

The (threshold) filtered absolute values of the filter coefficients $c_i'(n)$ are provided to the loss encoder block 670. The filtered absolute values of the filter coefficients $c_i'(n)$ may be summarized resulting to a summation value S'(n):

$$S'(n) = \sum_i c_i'(n) = \sum_i F_{TH}(\text{ABS}(c_i(n)))$$

In accordance with the above example, the loss encoder block 670 comprises a set of loss values, each of which is associated with a summation value interval, for instance in form of a range lookup table. The loss encoder block 670 selects a loss value form the set of loss values by comparing the determined summation value with the summation value intervals. The loss value associated with the summation value interval, which matches the determined summation value, is selected by the loss encoder block 670.

The absolute value blocks 650.0 to 650.L−1, the threshold filters 655.0 to 655.L−1 and/or an adder block 660 may be part of or arranged with the loss encoder block 670 or the adaptive filter.

The loss encoder block 670 may further process the filtered absolute values of the filter coefficients $c_i'(n)$. Each filtered absolute value of the filter coefficient $c_i'(n)$ is associated with a tapped delay signal r(n−i) and hence with a predefined timely delay. The predefined timely delay of each tapped delay signal r(n−i) is defined by design of the delay line and the delay elements $Z^{-1}$ 610.1 to 610.L−1.

The value $\Delta_i$ of the timely delay can be understood as a function of the index i:

$$\Delta_i = \Delta(i).$$

In an example, $$\Delta_i = \Delta(i) = \Delta_0 \cdot (i-1),$$

wherein $\Delta_0$ is the timely delay effected by each one of the delay elements 650.1 to 650.L−1. The index i relates in turn to the sampling index n, wherein $$R(n+1) = r(n-i),$$

wherein R(n) is the input signal at time $t = n \cdot T_s$, r(n−i) is the tapped delay signal at tap i (with a number of i−1 downstream arranged delay elements) and $T_s$ is the sampling time.

The time correlation of the filtered absolute values of the filter coefficients $c_i'(n)$ can be used by the loss encoder block 670 to associate a distance value to each filtered absolute values of the filter coefficients $c_i'(n)$. The loss encoder block 670 may comprise a lookup table, which associates each index i of the filter coefficient $c_i'(n)$ with a respective distance value d, wherein the distance d is in general a function of the index i: d=d(i).

The time correlation of filter coefficient $c_i'(n)$ may be used in particular for evaluating the filter coefficients of the echo canceller 310 and more particular the far-end echo signal contribution to the echo signal. As aforementioned, the far-end echo signal comprising one or more reflected remnant transmit signals, which are caused by one or more transmit signal reflections at one or more points along the transmission medium/communication link. A reflected remnant transmit signal is received at the receiver section 200 with time delay A, which is correlated with the distances between the link interface 330 and the respective point of reflection. This effect is considered for evaluating the filtered absolute values of the filter coefficients $c_i'(n)$.

Figure 7:
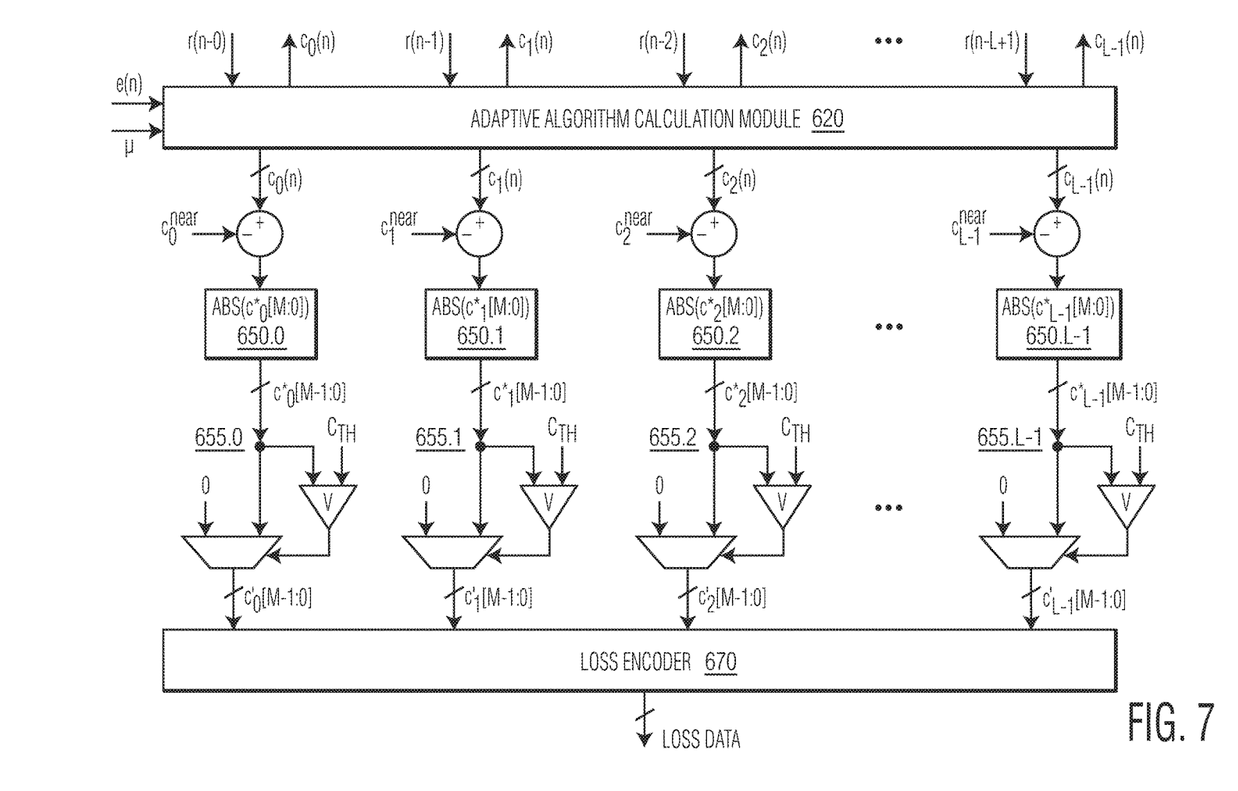
FIG. 7 schematically illustrates a block diagram of yet another adaptive filter implementation with a loss encoder block according to an example of the present invention.

In order to obtain the far-end echo signal, the contribution of the near-end echo signal to the echo signal may be cancelled. For instance, the near-end echo signal and the set of filter coefficients $c_i^{near}$, i=0, . . . , L−1, thereof are determined by a calibration measurement such as exemplified above. The near-end echo signal is assumed to be substantially constant. Hence, the values of the set of filter coefficients $c_i^{near}(n) = c_i^{near}$ can be assumed as constant values. FIG. 7 schematically illustrates a block diagram of a corresponding exemplary implementation of an adaptive filter with filter coefficient processing according to an embodiment of the present application. The adaptive filter illustrated in FIG. 7 substantially corresponds to the example adaptive filter of FIG. 6.

The values of the set of filter coefficients $c_i^{near}$ relating to the near-end echo signal are individually subtracted from the values of the filter coefficients ci(n) obtained from the adaptive convergence algorithm module 620:

$$c_i^{far}(n)=c_i^*(n)=c_i(n)-c_i^{near}$$

The filter coefficients $c_i^{far}(n)$ relating to the far-end echo signal contribution to the echo signal are further processed as described above.

A rapid change of one or more filter coefficients $c_i'(n)$ or $c_i^{far}(n)$ over time, which may be indicative of an exceptional condition on the communication link, is detectable by the loss encoder block 670. In particular a rapid increase of one or more absolute values of one or more filter coefficients $c_i'(n)$ or $c_i^{far}(n)$ may indicate a serious incident affecting the signal quality on the communication link.

The evaluation of the index-to-time correlation allows to identify an approximate localization associated with the exceptional conditions on the communication link. The approximate localization may be determined based on a time-to-distance correlation, wherein a distance is indicative of a localization along the communication link. The time-to-distance correlation may be determined from a distance as a function of time span and a signal propagation speed. The time-to-distance correlation may be determined from a lookup table, which comprises several entries, each of which associated a time span with a distance. The entries of such a lookup table may be obtained from calibration measurements, during which exceptional condition on the communication link are caused.

Figure 8:
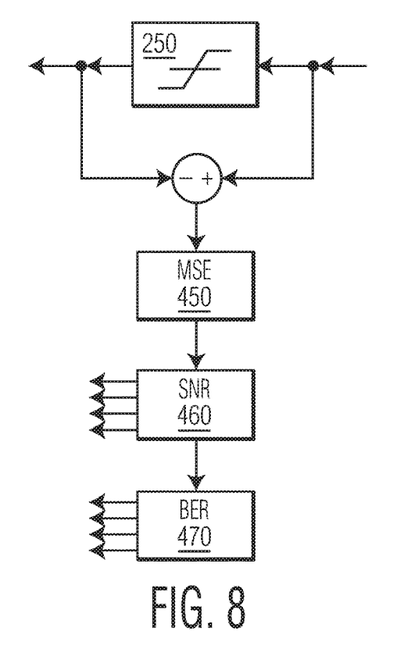
FIG. 8 schematically illustrates a block diagram of a MSE filter with SNR and BE encoder block according to an example of the present invention.

Referring now to FIG. 8, a block diagram of a signal quality assessment block comprising a mean squared error (MSE) filter according to an embodiment of the present application is schematically illustrated.

An output of the slicer 250 is compared with an input of the slicer 240 through compare circuitry. The compare circuitry supplies a residual signal to the MSE filter 450. Herein, the residual signal is the difference signal between the input signal to the slicer 240 and the output signal provided by the slicer 240. In an actual receiver, the slicer 240 is arranged to make binary decisions on its input based on whether the input is greater than or less than a defined slicer threshold. The probability of making an error depends on the amplitude of the input signal, the statistics of the input noise, and the threshold of the slicer. Hence, the residual signal supplied by the compare circuitry to the MSE filter 450 is indicative of the error of the slicer 240.

The set of filter coefficients of the MSE filter 450 are continuously adjusted to the input residual signal, which is changing over time. The set of adjusted filter coefficients is representative of errors associated with input residual signal. Based on the set of adjusted filter coefficients of the MSE filter 450, a signal-to-noise ratio (SNR) and further a bit-error-rate (BER) relating to a received signal at a current point in time can be determined using a SNR encoder block 430 and a BER encoder block 440.

Figure 9:
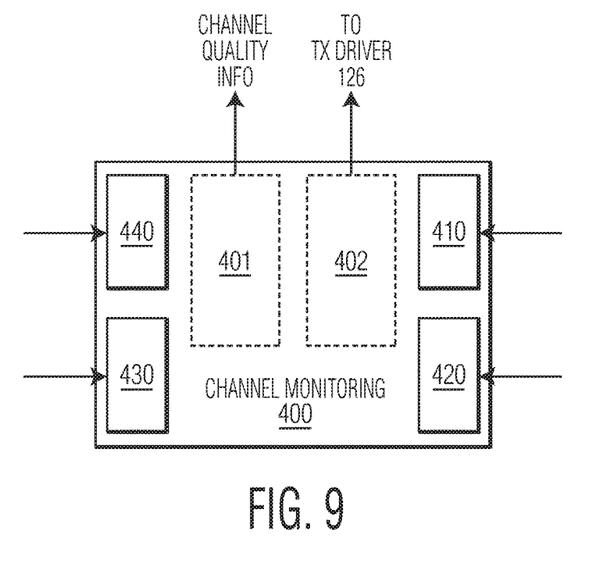
FIG. 9 schematically illustrates a block diagram of a channel monitoring block according to an example of the present invention.

Referring now to FIG. 9, the channel monitoring block 400 is arranged to collect the information relating to the quality of the communication link obtained from the equalizers and/or adaptive filters of the receiver section 200 of the PHY circuitry. In particular, the channel monitoring block 400 is arranged to collect the data generated by one or more of the encoder blocks 410, 420, 430 and 440. In general, the channel monitoring block 400 is provided to monitor the quality of the communication link, to control the amplitudes of the TX driver 126 of the AFE TX 126 of the transmitter section 100 of the PHY circuitry in response to the monitored quality and/or to provide information relating to the quality of the communication link. Herein, the quality of the communication link relates to the properties of signal transmission via the communication link. In particular, the quality or properties of the signal transmission includes inter alia return loss value data or value data representative thereof, insertion loss value data or value data representative thereof, BER value data and/or SNR value data. As exemplified above, such value data is provided by the respective one or ones of the aforementioned encoders 400 to 440.

The channel monitoring block 400 may be considered to comprise two subsection, an amplitude control section 402 and a channel quality section 401 at which the received value data is further processed. For instance, the amplitude control section 402 is provided to generate an amplitude control signal for controlling the amplitude of signals generated by the TX driver 126 of the AFE TX 120. More particular, the amplitude control section 402 is arranged to receive loss value data generated by the encoder blocks 410 and/or 420 and configured to determine an amplitude control signal based on the loss value data, which is for instance indicative of a current return loss and/or insertion loss on the communication link.

In an example, the channel monitoring block 400 may be coupled to or may comprise a return loss encoder 410, which is arranged to process the filter coefficients of the echo canceller 310. The loss encoder 410 is coupled to the echo canceller 310 and supplies loss value data determined from the filter coefficients of the echo canceller 310 to the channel monitoring block 400. The loss value data is representative of the return loss detected by the echo canceller 310 at a current point in time. As described above, the loss encoder 410 may be adapted to determine the far-end echo signal contribution to a current echo signal and the loss value data reported by the loss encoder 410 to the channel monitoring block 400 may be representative of the far-end echo signal contribution. Based on the loss value data, the amplitude control section 402 of the channel monitoring block 400 is configured to generate a signal amplitude control signal, which is supplied to the AFE TX 120 and the TX driver 126 thereof. The signal amplitude generated by the AFE TX 120 is hence adjusted based on the loss value data provided by the return loss encoder 410 to the channel monitoring block 400. For instance, in case of a less echo signal, the TX driver 126 may be controlled by the amplitude control section 402 of the channel monitoring block 400 to reduce the amplitude of the analog signals generated by the TX driver 126. In case of a high echo signal, the TX driver 126 may be controlled to increase the amplitude of the analog signals generated by the TX driver 126.

In an example, the channel monitoring block 400 may be coupled to or may comprise an insertion loss encoder 420, which is arranged to process the filter coefficients of the feed forward equalizer (FFE) 220 and/or the decision feedback equalizer (DFE) 230. The loss encoder 420 is coupled to the FFE 220 and/or DFE 230 and supplies loss value data determined from the filter coefficients of FFE 220 and/or DFE 230 to the channel monitoring block 400. The loss value data is representative of the insertion loss detected by the FFE 220 and/or DFE 230 at a current point in time. Based on the loss value data, the amplitude control section 402 of the channel monitoring block 400 is configured to generate a signal amplitude control signal, which is supplied to the AFE TX 120 and the TX driver 126 thereof. The signal amplitude generated by the AFE TX 120 is hence adjusted based on the loss value data provided by the insertion loss encoder 420 to the channel monitoring block 400. For instance, in case of a high insertion loss, the TX driver 126 may be controlled by the amplitude control section 402 of the channel monitoring block 400 to increase the amplitude of the analog signals generated by the TX driver 126. In case of a low insertion loss, the TX driver 126 may be controlled to reduce the amplitude of the analog signals generated by the TX driver 126.

The channel monitoring block 400 may receive loss value data generated by several loss encoders based on the filter coefficients of the echo canceller 310, the feed forward equalizer (FFE) 220 and/or the decision feedback equalizer (DFE) 230. The amplitude control section 402 is configured to determine an amplitude control signal, which considers the effect of increasing or reducing of the amplitude of the transmission signal with regard to return loss and insertion loss in order to obtain an overall improved transmission quality of the communication link.

In an example, the loss value data received from several loss encoders may be combined by using a weighted average algorithm to obtain resultant loss value data. The value data may be translated into an amplitude control signal using a lookup table, which associates loss value data or ranges thereof with amplitude control signals. The amplitude control signals may be selected to control the amplitude of the TX signal at a level within a permissible amplitude level range for the communication link.

The channel quality section 401 of the channel monitoring block 400 may be arranged to receive further data relating to the quality of the communication link. In particular, the channel quality section 401 may receive the threshold filtered absolute filter coefficients from the loss encoder blocks 410, 420.

The threshold filtered absolute filter coefficients enable the channel quality section 401 of the channel monitoring block 400 to generate and provide diagnostics information about the communication link. In particular, the channel quality section 401 is configured to monitor the development of the supplied filter coefficients over time. The time based monitoring enables the channel quality section 401 to detect changes of the characteristics and properties of the communication link. Such changes of the characteristics and properties of the communication link are reflected by changing values of the filter coefficients. The association between indexes of the threshold filtered absolute filter coefficients and time delays/distances enables the channel quality section 401 to localize a detected change of a threshold filtered absolute filter coefficient along the communication link. The information about the quality of the communication link may be provided to higher layer components to server for failure diagnostics and troubleshooting.

The channel quality section 401 of the channel monitoring block 400 may further receive the signal-to-noise (SNR) value and bit-error-rate (BER) value from the SNR encoder block 430 and the BER encoder block 440. The signal-to-noise (SNR) value and bit-error-rate (BER) value supplement the quality information obtained by monitoring the threshold filtered absolute filter coefficients supplied by the loss encoder blocks 410, 420 to the channel quality section 401.

In an example, the data relating to the quality of the communication link collected by the channel quality section 401 and the information about the quality of the communication link provided by the channel quality section 401 may be made available to the amplitude control section 402. Based on the information obtainable by the amplitude control section 402 from the channel quality section 401, the amplitude control section 402 is for instance enabled to monitor the effects on the signal transmission quality of the communication link in response to an instructed change (increase or reduction) of the signal amplitude generated by the TX driver 216.

According to an aspect of the present application, a baseband communications transceiver is provided, which comprises an analog front end transmitter section, AFE TX, and an analog front end receiver section, AFE RX. The analog front end transmitter section, AFE TX, and the analog front end receiver section, AFE RX are part or a PHY circuitry. The analog front end transmitter section, AFE TX, comprises a digital to analog converter, DAC, and a transmission, TX, driver. The analog front end receiver section, AFE RX, comprises an analog-to-digital converter, ADC. The baseband communications transceiver further comprises at least one equalizer, which is arranged downstream of the AFE RX and implemented on the basis of an adaptive filter. The baseband communications transceiver further comprises at least one loss encode, which is coupled to the at one equalizer and configured to determine loss value data indicative of a signal loss on the communication channel based on filter coefficients of the adaptive filter. A channel monitoring block of the baseband communications transceiver is provided and configured to receive the loss value data from the at least one loss encoder to determine an amplitude control signal, which is provided to control the amplitude of analog signals generated by the TX driver of the AFE TX. In an example, at least one equalizer comprises an echo canceller, a feed forward equalizer, FFE, and/or a decision feedback equalizer, DFE.

In an example, the loss encoder is arranged to receive a set of filter coefficient values, $c_i(n)$, from an adaptive convergence algorithm module of the adaptive filter and configured to determine a summation value, $S(n)$, of absolute values of the filter coefficients. The loss value data determined by the at least one loss encoder is a function of the summation value, $S(n)$. In an example, the loss encoder comprises a loss value lookup table, which associates summation values, $S(n)$, with respective loss value data.

In an example, the loss encoder is further configured to apply a threshold filter to each absolute filter coefficient value. The threshold filter is configured to pass absolute filter coefficient values, which exceed a predefined threshold value, $c_{TH}$.

In an example, each filter coefficient is associated with a time delay defined by delay elements of a delay line of the adaptive filter. The loss encoder is configured to assign a distance value based on the time delay to each filter coefficient. In an example, the loss encoder comprises a distance lookup table, which associates filter indexes with distance values, wherein the indexes are indicative of the associated time delays.

In an example, the baseband communications receiver further comprises a slicer arranged downstream the AFE RX, a mean square error, MSE, filter and at least one of a signal-to-noise ratio, SNR, encoder block and a bit-error-rate, BER, encoder block. The mean square error, MSE, filter is arranged to receive a residual signal, which is representative of the difference between an input signal and the output signal of the slicer and which is configured to determine a mean square error, MSE, value. The signal-to-noise ratio, SNR, encoder block is configured for determining a SNR value. The bit-error-rate, BER, encoder block is configured for determining a BER value. The SNR value and/or the BER value are a function of the MSE value. In an example, the channel monitoring block (400) is configured to receive the SNR value and/or the BER value.

In an example, the baseband communications receiver is an Ethernet transceiver and in particular, an automotive Ethernet transceiver arranged for bidirectional communication via a single twisted pair cable.

According to an embodiment, a method of operating a baseband communications transceiver is provided. The baseband communications transceiver comprises an analog front end transmitter section, AFE TX, with a digital to analog converter, DAC, and a transmission, TX, driver; an analog front end receiver section, AFE RX, with an analog-to-digital converter, ADC; and at least one equalizer. The at least one equalizer is arranged downstream of the AFE RX and implemented on the basis of an adaptive filter. Filter coefficients are obtained from the adaptive filter of the at least one equalizer. Loss value data is determined, which is indicative of a signal loss on a communication channel based on the obtained filter coefficients of the adaptive filter. An amplitude control signal is generated at a channel monitoring block. The amplitude control signal is based on the loss value data to control the amplitude of analog signals generated by the TX driver of the AFE TX.

According to an example, the filter coefficient values are received from an adaptive convergence algorithm module of the adaptive filter. Absolute values of the received filter coefficient values are determined and a summation value of the absolute values of the filter coefficients is further determined. The loss value data is generated based on the determined summation value.

According to an example, a threshold filter is applied to each one of the absolute values of the filter coefficients. The threshold filter is configured to pass absolute filter coefficient values, which exceed a predefined threshold value. The threshold filtered absolute values of the filter coefficients are provided to the channel monitoring block.

According to an example, each filter coefficient is associated with a time delay defined by delay elements of a delay line of the adaptive filter. A distance value is assigned based on the time delay to each filter coefficient.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A baseband communications transceiver, comprising
an analog front end transmitter section, AFE TX, comprising a digital to analog converter, DAC, and a transmission, TX, driver;
an analog front end receiver section, AFE RX, comprising an analog-to-digital converter, ADC;
at least one equalizer, which is arranged downstream of the AFE RX and implemented on the basis of an adaptive filter;
at least one loss encoder, which is coupled to the at one equalizer and configured to determine loss value data indicative of a signal loss on a communication channel based on filter coefficients of the adaptive filter; and
a channel monitoring block, which is configured to receive the loss value data from the at least one loss encoder and to determine an amplitude control signal, wherein the amplitude control signal controls amplitude of analog signals generated by the TX driver of the AFE TX.

2. The baseband communications transceiver of claim 1, wherein the at least one equalizer comprises at least one of an echo canceller, a feed forward equalizer, FFE, and a decision feedback equalizer, DFE.

3. The baseband communications transceiver of claim 1, wherein the loss encoder is arranged to receive values of the filter coefficient from an adaptive convergence algorithm module of the adaptive filter and configured to determine a summation value of absolute values of the filter coefficients,
wherein the loss value data determined by the loss encoder is a function of the summation value.

4. The baseband communications transceiver of claim 3, wherein the loss encoder comprises a loss lookup table, which associates summation values with respective loss value data.

5. The baseband communications transceiver of claim 3, wherein the loss encoder is further configured to apply a threshold filter to a plurality of absolute filter coefficient values, wherein the threshold filter is configured to pass absolute filter coefficient values that exceed a predefined threshold value.

6. The baseband communications transceiver of claim 5, wherein each filter coefficient is associated with a time delay defined by delay elements of a delay line of the adaptive filter,
wherein the loss encoder is configured to assign a distance value based on the time delay to each filter coefficient.

7. The baseband communications transceiver of claim 6, wherein the loss encoder comprises a distance lookup table that associates filter indexes with distance values in the distance lookup table, wherein the indexes are indicative of the associated time delays.

8. The baseband communications transceiver of claim 1, further comprising:
a slicer arranged downstream the AFE RX;
a mean square error, MSE, filter, wherein the MSE filter is arranged to receive a residual signal that represents a difference between an input signal and the output signal of the slicer, wherein the MSE filter is configured to determine a mean square error, MSE, value; and
at least one of a signal-to-noise ratio, SNR, encoder block configured for determining a SNR value and a bit-error-rate, BER, encoder block configured for determining a BER value, wherein the SNR value and/or the BER value are a function of the MSE value.

9. The baseband communications transceiver of claim 8, wherein the channel monitoring block is configured to receive the SNR value and/or the BER value.

10. The baseband communications transceiver of claim 1, wherein the baseband communications receiver is an Ethernet transceiver arranged for bidirectional communication via a single twisted pair cable.

11. A method of operating a baseband communications transceiver, wherein the baseband communications transceiver comprises an analog front end transmitter section, AFE TX, comprising a digital to analog converter, DAC, and a transmission, TX, driver; an analog front end receiver section, AFE RX, comprising an analog-to-digital converter, ADC; and at least one equalizer, which is arranged downstream of the AFE RX and implemented on the basis of an adaptive filter, said method comprising:
obtaining filter coefficients from the adaptive filter of the at least one equalizer;
determining loss value data indicative of a signal loss on a communication channel based on the obtained filter coefficients of the adaptive filter; and
generating, at a channel monitoring block, an amplitude control signal based on the loss value data to control amplitude of analog signals generated by the TX driver of the AFE TX.

12. The method according to claim 11, further comprising receiving values of the filter coefficient from an adaptive convergence algorithm module of the adaptive filter;
determining absolute values of the received values of the filter coefficients;
determining a summation value of the absolute values of the filter coefficients; and
generating the loss value data based on the determined summation value.

13. The method according to claim 12, further comprising:
applying a threshold filter to each one of the absolute values of the filter coefficients, wherein the threshold filter is configured to pass absolute filter coefficient values that exceed a predefined threshold value; and
providing the threshold filtered absolute values of the filter coefficients to the channel monitoring block.

14. The method according to claim 13,
wherein each filter coefficient is associated with a time delay defined by delay elements of a delay line of the adaptive filter,
said method further comprising:
assigning a distance value based on the time delay to each filter coefficient.

15. A non-transitory computer readable storage medium bearing computer executable instructions for operating a baseband communications transceiver, wherein the instructions, when executing on one or more processing devices, cause the one or more processing devices to perform the method according to claim 11.

* * * * *